July 19, 1932.  A. S. HUBBARD  1,867,667
CURRENT RECTIFYING APPARATUS
Filed July 21, 1928
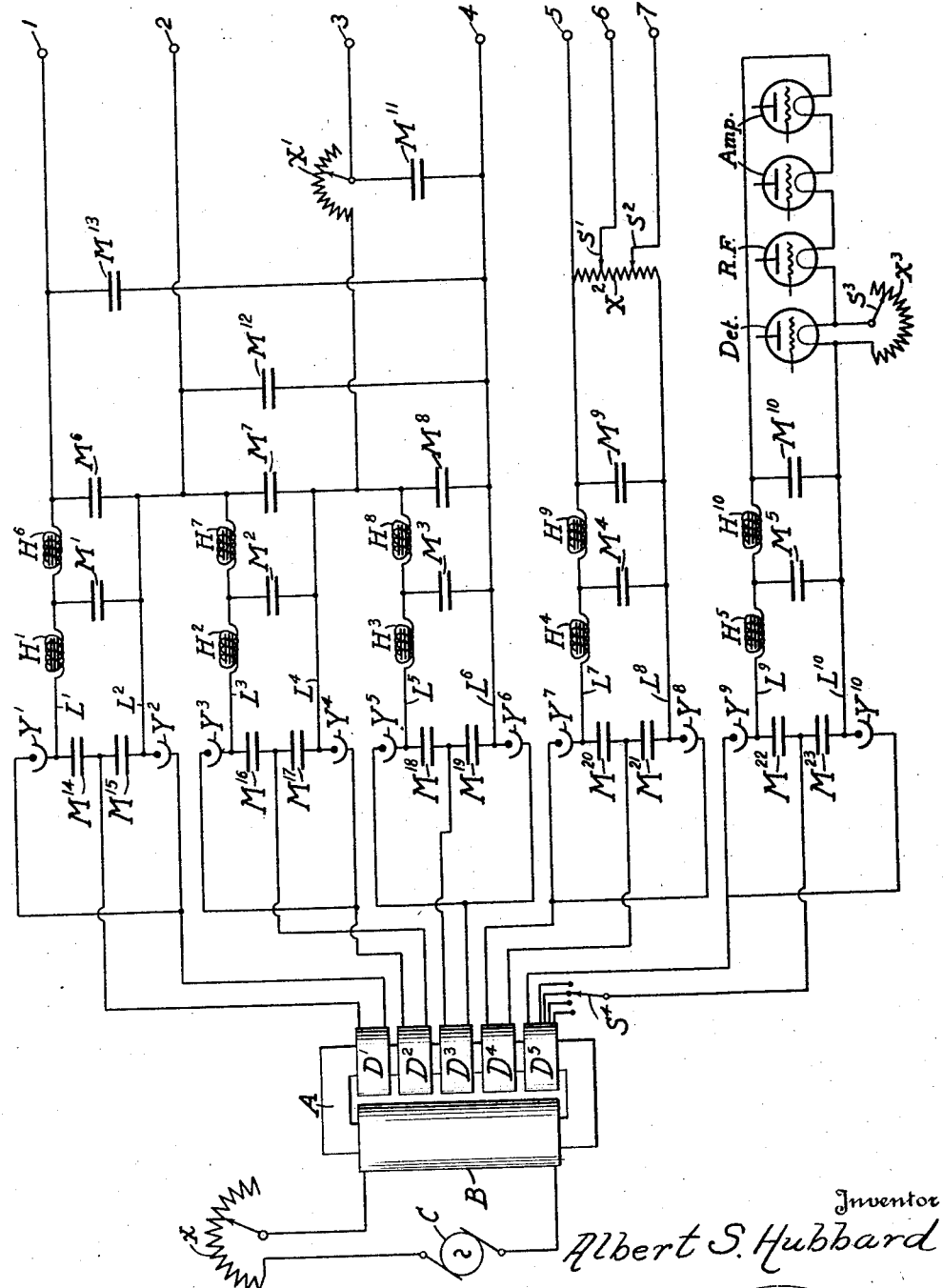
Inventor
Albert S. Hubbard
By his Attorney Patented July 19, 1932

1,867,667

UNITED STATES PATENT OFFICE

ALBERT S. HUBBARD, OF BETHEL, CONNECTICUT, ASSIGNOR, BY MESNE ASSIGNMENTS, TO GOULD STORAGE BATTERY CORPORATION, OF DEPEW, NEW YORK, A CORPORATION OF DELAWARE

CURRENT RECTIFYING APPARATUS

Application filed July 21, 1928. Serial No. 294,463.

The invention relates to the art of rectifying alternating currents.

The principal object of the invention is to provide a means for and system of rectification of an alternating current whereby to obtain direct current of different voltages particularly well adapted for use in connection with a radio apparatus for energizing the same and to supply thereto the "A", "B" and "C" currents, the apparatus consequently entirely replacing the batteries commonly provided for the purpose.

Another object of the invention is to provide a rectifying system in which the strains on the rectifying means will be minimized.

It has been found that it is characteristic of the electrolytic rectifying cells commonly used that they develop varying internal resistance when connected in series. The result of variation of internal resistance in one cell is to vary the terminal voltage of the unit, the variations being as great as 20 or 30% at the terminals with consequent fluctuation of the signal strength of a radio apparatus energized by electrolytically rectified current.

It is with the above fact in view that the present invention has for an object the provision of a system for and method of rectification which will overcome these difficulties by producing an output voltage not subject to any material variations.

Another object of the invention is to provide a system and apparatus of this character having adequate means for accurately supplying the proper or necessary voltages for the different circuits to be energized or operated.

An additional object is to provide a system of this character which will be comparatively simple, inexpensive, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

The figure is a diagram showing the complete arrangement of the system.

Referring to the drawing in detail, A represents the core of a transformer having its primary winding B connected to a source of alternating current C through an adjusting or regulating rheostat X. The core carries a plurality of separate secondary coils $D^1$, $D^2$, $D^3$, $D^4$ and $D^5$. Each secondary is connected to a rectifier storage system consisting of two rectifiers and two condensers as illustrated. More specifically, the secondary coil $D^1$ is connected with the rectifiers $Y^1$ and $Y^2$ in series with the condensers $M^{14}$ and $M^{15}$; $D^2$ is connected with the rectifiers $Y^3$ and $Y^4$ in series with the condensers $M^{16}$ and $M^{17}$; $D^3$ is connected with the rectifiers $Y^5$ and $Y^6$ and the condensers $M^{18}$ and $M^{19}$ in series therewith; $D^4$ is connected with the rectifiers $Y^7$ and $Y^8$ and the condensers $M^{20}$ and $M^{21}$ in series therewith; and $D^5$ is connected with the rectifiers $Y^9$ and $Y^{10}$ and the condensers $M^{22}$ and $M^{23}$. It will be observed that in each instance one conductor from the secondary connects directly with both rectifiers whereas the other connects between the two condensers.

It will be observed that the system is capable of supplying "A", "B" and "C" current to a radio apparatus. The secondaries $D^1$, $D^2$ and $D^3$ and the rectifying and storage means connected therewith will supply the "B" current which is necessarily of various voltages for audio frequency, radio frequency and detector use. The audio frequency amplifier voltage is obtained at a terminal 1 connected by the conductor $L^1$ with the rectifier $Y^1$ at the terminal thereof other than the one to which the secondary $D^1$ is connected. The voltage for the operation of any stage or stages of radio frequency amplification is obtained from a terminal 2 connected by conductors $L^2$ and $L^3$ with the rectifiers $Y^2$ and $Y^3$ at the terminals thereof other than those to which the secondaries $D^1$ and $D^2$ are connected. The detector voltage is obtained from a terminal 3 connected by conductors $L^4$ and $L^5$ with the rectifiers $Y^4$ and $Y^5$. The negative connection is made at the terminal 4 which is connected by the conductor $L^6$ with the rectifier $Y^6$. It will be observed that the rectified outputs from the secondaries $D^1$, $D^2$ and $D^3$ are in series in order to obtain higher voltages than would be possible with one pair of the rectifying cells. It is of course apparent that the highest voltage is obtained at the terminal 1, the progressively lower voltages being obtained at the terminals 2 and 3. For controlling the detector voltage, as is necessary, I provide a rheostat $X^1$ interposed between the terminal 3 and the conductors $L^4$ and $L^5$.

The "C" voltages are obtained from the rectified output from the secondary $D^4$, as will be readily apparent, there being terminals 5, 6 and 7, the former being connected by a conductor $L^7$ with the rectifier $Y^7$, and the two latter being connected with movable contacts $S^1$ and $S^2$, respectively, adjustable along a resistance $X^2$ connected between the conductor $L^7$ and a conductor $L^8$ which connects with the rectifier $Y^8$. By adjusting the resistance the voltage at the terminals 5, 6 and 7 may be readily controlled.

The rectified output from the secondary $D^5$ supplies the "A" current. The diagram shows the filaments of a plurality of tubes indicated at Det., R. F. and Amp., these filaments being connected by conductors $L^9$ and $L^{10}$ with the rectifiers $Y^9$ and $Y^{10}$. A suitable rheostat $X^3$ with movable arm $S^3$ is provided for controlling the voltage supplied to the filament of the detector tube. The voltage to all of the filaments may be additionally controlled by properly manipulating a switch $S^4$ which is engageable with any one of a plurality of taps taken off from the secondary $D^5$. Variations in the voltage of the supply current fed to the primary B may be compensated for by adjusting the rheostat X which is interposed in series between the AC source C and the primary B.

In circuits of this general type, it is customary and in fact necessary to smooth out the direct current output and it is for this reason that I have illustrated filter means comprising inductances $H^1$ and $H^6$, $H^2$ and $H^7$, $H^3$ and $H^8$, $H^4$ and $H^9$, and $H^5$ and $H^{10}$ connected in series in the respective leads $L^1$, $L^3$, $L^5$, $L^7$ and $L^9$, together with condensers of suitable capacity $M^1$ and $M^6$, $M^2$ and $M^7$, $M^3$ and $M^8$, $M^4$ and $M^9$, and $M^5$ and $M^{10}$, bridged respectively across the conductors $L^1$ and $L^2$, $L^3$ and $L^4$, $L^5$ and $L^6$, $L^7$ and $L^8$, and $L^9$ and $L^{10}$. In some instances it may be necessary to provide by-pass condensers $M^{11}$, $M^{12}$ and $M^{13}$ bridging across from the negative lead $L^6$ to the detector, radio frequency and amplifier leads, respectively, this of course depending to a certain extent upon the characteristics of the particular radio apparatus being energized though the condenser $M^{11}$ is generally necessary to by-pass the radio frequency currents.

Of course the action is at least substantially the same throughout all the portions of the system and it is therefore thought to be sufficient to refer to it in connection with the output from the secondary $D^1$ in which, for instance, the positive wave charges the condenser $M^{14}$ through the rectifier $Y^1$ and the negative wave charges the condenser $M^{15}$ through the rectifier $Y^2$, both condensers discharging direct current to the lines $L^1$ and $L^2$. The direct current voltage depends on the load on the lines, on the capacity of the condensers, and on the AC voltage of the secondary, the limit being the break-down voltage of the rectifiers which are preferably of the electro-chemical type.

To reduce the electrical strains on the secondaries $D^1$ to $D^5$, the connections may be reversed as illustrated, for instance, assuming the secondaries to be all wound in the same direction, the top terminals of $D^1$ and $D^3$ may be connected to the midpoints of the corresponding condensers while the bottom terminal of $D^2$ may be connected to the midpoint of its pair of condensers.

From the foregoing description and a study of the drawing it will be apparent that I have thus provided a very simple power system or distribution system by means of which alternating current may be rectified and its voltage stepped up or down, as the case may be, for energizing apparatus, different portions of which necessitate different currents, the apparatus being particularly suited for use in connection with the energization or operation of radio apparatus. Ample provision has been made for relieving the strains on the transformer and for making the necessary adjustments to compensate for different conditions which may exist in the local circuits and also in the feed, power or supply circuit. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the detailed arrangement, association and combination of circuits and control means as will not depart from the spirit of the invention or the scope of the claim hereunto appended.

Having thus described the invention, I claim:

In a current distribution system, an alternating current supply circuit, a transformer having a primary included in the supply circuit and further having a plurality of secondary coils, the secondary coils being arranged in a circuit including a plurality of rectifiers and capacitances, the rectifiers being similarly arranged and connected in series with each other and with the corresponding capacitances, one terminal of each secondary coil being connected between the associated capacitances and the other being connected directly to both associated rectifiers, the connection of the successive secondary coils with the associated and corresponding rectifiers and condensers being reversed to eliminate strain.

In testimony whereof I affix my signature.

ALBERT S. HUBBARD.